United States Patent [19]
Ota et al.

[11] Patent Number: 4,778,242
[45] Date of Patent: Oct. 18, 1988

[54] REINFORCEMENT FOR OPTICAL-FIBER JOINT

[75] Inventors: Takashi Ota, Komaki; Mikio Kariya, Nagoya, both of Japan

[73] Assignee: NGK Insulators, Ltd., Aichi, Japan

[21] Appl. No.: 79,135

[22] Filed: Jul. 29, 1987

[30] Foreign Application Priority Data

Aug. 5, 1986 [JP] Japan .................. 61-184043

[51] Int. Cl.$^4$ .............................................. G02B 6/36
[52] U.S. Cl. ............................ 350/96.21; 350/96.20; 350/96.22; 350/96.34; 350/96.23
[58] Field of Search ............... 350/96.10, 96.20, 96.18, 350/96.21, 96.22, 96.23, 96.34, 320, 96.15; 65/30.13, 30.14, 3.14, 3.2, 4.1, 152, 156; 156/643, 663, 99, 107, 158, 160, 163, 308.2, 309.9

[56] References Cited

U.S. PATENT DOCUMENTS

| 3,533,897 | 10/1970 | Robbins, Jr. et al. ......... 350/320 X |
| 3,639,114 | 2/1972 | Loukes ........................ 65/30.13 X |
| 3,857,689 | 12/1974 | Koizumi et al. ............... 65/30.13 X |
| 3,959,000 | 5/1976 | Nakagawa et al. ............ 65/30.14 X |
| 3,984,172 | 10/1976 | Miller ............................ 350/96.21 |
| 4,046,454 | 9/1977 | Pugh, III ...................... 350/96.21 |
| 4,103,987 | 8/1978 | Kersten ......................... 350/96.21 |
| 4,118,618 | 10/1978 | Gauthier et al. .............. 350/96.20 |
| 4,146,301 | 3/1979 | Cherin et al. ................. 350/96.21 |
| 4,160,580 | 7/1979 | Le Noane et al. ............. 350/96.21 |
| 4,227,951 | 10/1980 | Mignien ........................ 350/96.21 |
| 4,254,865 | 3/1981 | Pacey et al. ................... 350/96.21 |
| 4,288,143 | 9/1981 | Di Vita ......................... 350/96.21 |
| 4,468,089 | 8/1984 | Brorein ......................... 350/96.23 |
| 4,523,810 | 6/1985 | Goss et al. ..................... 350/320 |
| 4,594,121 | 6/1986 | Mitch ............................ 350/96.21 |
| 4,647,150 | 3/1987 | De Santi et al. .............. 350/96.21 |
| 4,662,713 | 5/1987 | Davies et al. .................. 350/96.20 |
| 4,699,462 | 10/1987 | Jones ............................ 350/96.23 |
| 4,711,518 | 12/1987 | Shank et al. .................. 350/96.20 |
| 4,725,117 | 2/1988 | Ellis .............................. 350/96.20 |
| 4,730,892 | 3/1988 | Anderson et al. ............. 350/96.21 |

FOREIGN PATENT DOCUMENTS

| 1160084 | 1/1984 | Canada ............... 350/96.21 |
| 0171614 | 2/1986 | European Pat. Off. ......... 350/96.20 |
| 3233234 | 3/1984 | Fed. Rep. of Germany ... 350/96.20 |
| 54-151049 | 11/1979 | Japan ............................. 350/96.18 |
| 56-133707 | 10/1981 | Japan ............................. 350/96.21 |
| 57-186717 | 11/1982 | Japan ............................. 350/96.20 |
| 58-2813 | 1/1983 | Japan ............................. 350/96.20 |
| 58-25611 | 2/1983 | Japan ............................. 350/96.21 |
| 58-87517 | 5/1983 | Japan ............................. 350/96.20 |
| 58-105505 | 7/1983 | Japan . |
| 60-142312 | 7/1985 | Japan ............................. 350/96.20 |
| 2046466 | 11/1980 | United Kingdom ............. 350/96.21 |
| 2148537 | 5/1985 | United Kingdom ............. 350/96.21 |

OTHER PUBLICATIONS

Balliet et al., "Fiber-Optic Splicing Tool" I.B.M. Tech. Discl. Bull., vol. 25, No. 7A, 12/82, pp. 3433–3434.

Primary Examiner—William L. Sikes
Assistant Examiner—Brian M. Healy
Attorney, Agent, or Firm—Parkhurst, Oliff & Berridge

[57] ABSTRACT

A reinforcement for reinforcing a joint at which two lengths of an optical-fiber cable consisting of at least one optical fiber are spliced by fusion welding, such that a spliced stripped part of each optical fiber and adjacent coated parts of the cable are secured to the reinforcement by an adhesive material. The reinforcement is formed of a transparent crystallized glass which has a major crystalline component consisting of $Li_2O$, $Al_2O_3$ and $SiO_2$ and which has a low coefficient of thermal expansion. The reinforcement has a contact surface which is roughened by machining and at which the reinforcement contacts the optical-fiber cable. A strengthened layer is formed by ion exchange, on an entire surface of the reinforcement, and an adhesive layer is formed on the rough contact surface, to secure the optical-fiber cable to the contact surface, upon heating of the adhesive layer, such that the adhesive material serves to smooth the rough contact surface, and thereby renders the rough contact surface transparent.

8 Claims, 2 Drawing Sheets

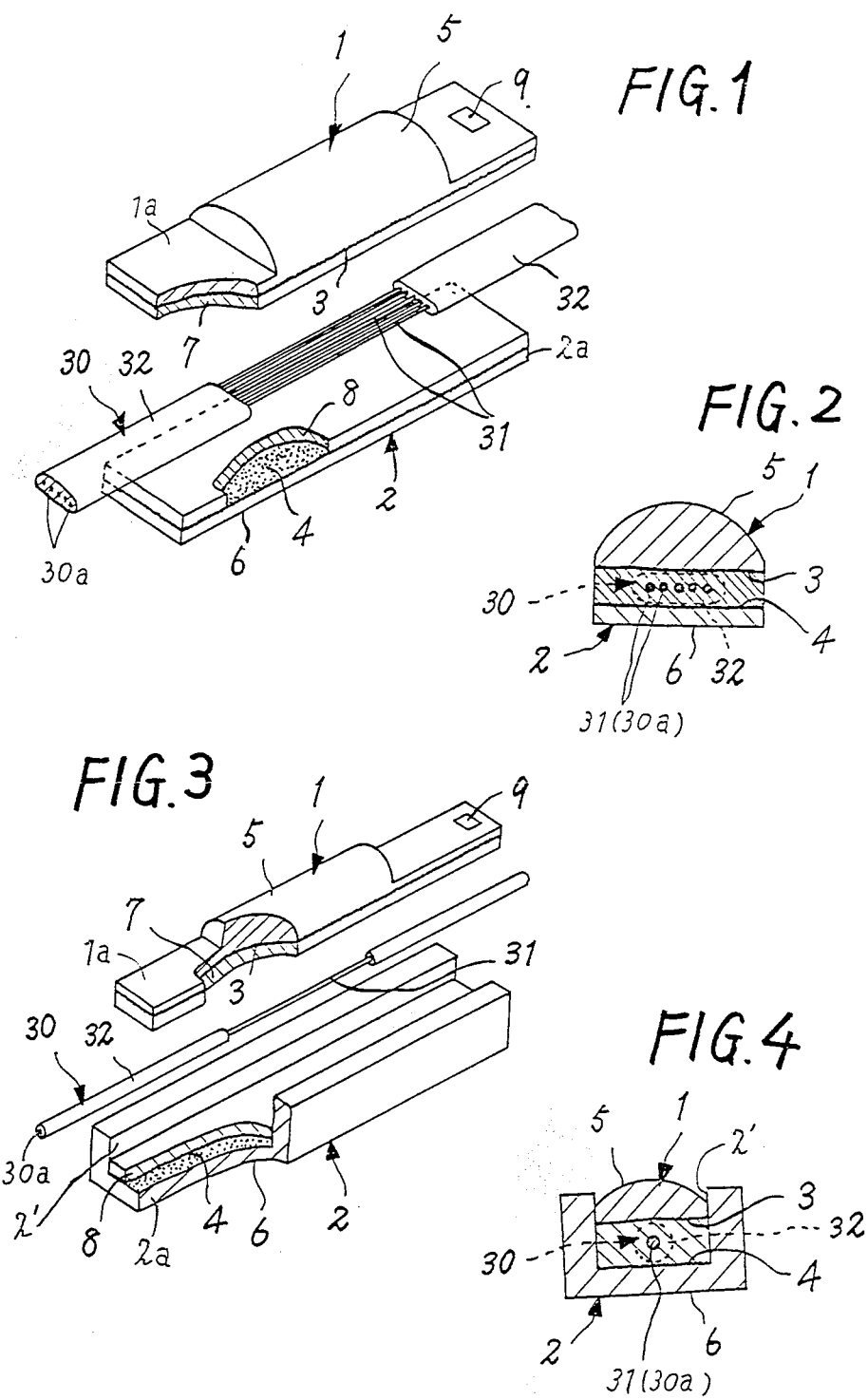

REINFORCEMENT FOR OPTICAL-FIBER JOINT

BACKGROUND OF THE INVENTION

1. Field of the Invention

The present invention relates to improvements in a reinforcement used for reinforcing a joint at which two lengths of an optical-fiber cable or optical waveguide are spliced by fusion welding.

2. Discussion of the Prior Art

To improve the reliability of a fusion-welded joint of an optical fiber cable, it is effective to secure both of fusion-spliced stripped parts of optical fibers and coated or covered portions of the cable, to a suitable reinforcement member. Conventionally, such a reinforcement member is usually made of a plastic or metallic material. However, the conventionally used reinforcement member has some problems, such as a thermal stress developed in the optical fibers due to a relatively large difference in coefficient of thermal expansion between the materials of the reinforcement member and the optical fibers, and inability to permit visual inspection of the joint, due to opacity of the reinforcement member. In view of these problems, it has recently been proposed to use a reinforcement member which is made of a transparent crystallized glass having a low coefficient of thermal expansion, as disclosed in laid-open publication No. 58-105505 (published on July 18, 1983) of Japanese Utility Model Application. In this case, the reinforcement member is produced by machining a crystallized glass workpiece to desired dimensions. As is usually the case with ceramic materials in general, the mechanical strength of the crystallized glass material is remarkably reduced if the material cracks on its surfaces during machining thereof. As a result, the reinforcement member produced from such a glass material tends to be easily damaged or broken if dropped or upon application of pressure to secure the optical fibers, during an operation to reinforce the joint of the optical-fiber cable with the reinforcement member. In particular, this insufficiency of mechanical strength of the reinforcement member is a big barrier to improved reliability of the joint of the optical-fiber cable, under a recent increasing need of miniaturizing the reinforcement member while dealing with an increasing number of fibers used in a cable. In an effort to eliminate minute cracks on the surface of the reinforcement member, which causes the deterioration of the mechanical strength, an attempt was made to treat the reinforcement member with a hydrofluoric acid. However, the treatment with the hydrofluoric acid roughened or frosted the entire treated surface, causing the reinforcement member to lose its transparency. Further, the attempt encountered a problem of pollution due to the use of the hydrofluoric acid. For these reasons, the above method was not practiced in the industry. Another disadvantage of the conventional reinforcement member made of a crystallized glass was recognized in the art. Namely, an adhesive agent applied to a joint for securing the optical fibers to the reinforcement member easily loses its adhesiveness to the optical-fiber cable, due to moisture, etc., during use of the optical-fiber cable. Thus, there has been a need in the industry, to provide a solution to the problems discussed above.

SUMMARY OF THE INVENTION

The present invention was developed in the light of the problems experienced in the prior art. It is therefore an object of the present invention to provide a reinforcement for a joint of an optical-fiber cable, which is made of a crystallized glass utilizing its conventionally recognized advantages of high transparency and low thermal expansion coefficient, and which has increased mechanical strength and adhesiveness sufficient to assure improved reliability of the joint.

The above object may be achieved according to the principle of the present invention, which provides a reinforcement for reinforcing a joint at which two lengths of an optical-fiber cable consisting of at least one optical fiber are spliced by fusion welding, such that a spliced stripped part of each optical fiber and adjacent coated parts of the cable are secured to the reinforcement by means of an adhesive material, wherein the improvement comprises: a base or substrate formed of a transparent crystallized glass which has a major crystalline component consisting of $Li_2O$, $Al_2O_3$ and $SiO_2$ and which has a low coefficient of thermal expansion; the base having a rough contact surface which is roughened by machining and at which the base contacts the optical-fiber cable; a strengthened layer which is formed by ion exchange, on an entire surface of the base including the rough contact surface; and an adhesive layer which consists of the adhesive material and which is formed on the rough contact surface. The adhesive layer secures the optical-fiber cable to the base, upon heating of the adhesive layer, such that the adhesive material serves to smooth the roughened contact surface, and thereby renders the rough contact surface transparent.

In the reinforcement of the present invention constructed as described above, substantially no thermal stresses are exerted on the optical-fiber cable, since the base is formed of a crystallized glass material which has a low thermal expansion property, having substantially the same thermal expansion coefficient as that of the optical fiber or fibers. Further, the strengthened layer formed by ion-exchange on the entire surface of the base is effective to protect the reinforcement against damage or breakage when dropped upon application of hot-pressing pressure to the reinforcement. In addition, the contact surface which is purposely roughened by grinding or abrasion processing permits separation-free, firm retention of the optical-fiber cable to the contact surface, since the adhesive layer is anchored to the roughened contact surface of the base upon melting thereof. According to an experiment, the adhesive layer on the base had an adhesive force of as high as 3.0 kg, as compared with an adhesive force of 0.7 kg of an adhesive layer formed on a mirror-like surface of the base of a comparative specimen. While the roughening of the contact surface causes the contact surface to lose its transparency, the adhesive material enables the roughened contact surface to recover its transparency, permitting external visual inspection of the joint. In this connection, it is preferable that the base has a semicylindrical surface opposite to the contact surface, so that the base serves as a convex lens which magnifies an image of the spliced stripped part of each optical fiber, and thereby facilitates the visual inspection. As described above, the reinforcement provided by the present invention overcomes the problems experienced in the prior art reinforcement used for a joint of the optical-fiber cable discussed above, and is therefore suitably used to reinforce the joint with improved reliability. Thus, the present invention greatly contributes to progress in the optical fiber industry.

The base of the reinforcement of the invention may be formed, for example, from a melt which includes 1.7-6% by weight of $Li_2O$, 12-35% by weight of $Al_2O_3$ and 55-75% by weight of $SiO_2$ as a glass component, and 0-3% by weight of $TiO_2$, 0.1-5% by weight of $ZrO_2$ and 0-5% by weight of $P_2O_5$ as a nucleation agent. The formed base is heat-treated so that $Li_2O$-$Al_2O_3$-$SiO_2$ crystals are precipitated. It is desirable that the obtained precipitate is $\beta$- eucryptite crystals having a grain size of not greater than 0.1 microns, so that the base of the reinforcement has substantially the same coefficient of thermal expansion as that ($\alpha$=approx. $4\times10^{-7}/°C.$) of the optical fibers which are made of quartz glass, and has a sufficient degree of transparency. The prepared base of the transparent crystallized glass is machined to desired shapes, such as planar bodies as shown in FIGS. 1 and 2, a rectangular body having a rectangular groove as shown in FIGS. 3 and 4, and a rod-like body as shown in FIGS. 5 and 6, which will be described in detail.

BRIEF DESCRIPTION OF THE INVENTION

The above and optional objects and features of the invention will be better understood by reading the following detailed description of preferred embodiments of the invention, when considered in connection with the accompanying drawings, in which:

FIG. 1 is a partly cutaway, perspective view showing a first embodiment of a reinforcement of the present invention;

FIG. 2 is an elevational cross sectional view of the embodiment of FIG. 1;

FIG. 3 is a partly cutaway, perspective view showing a second embodiment of the invention;

FIG. 4 is an elevational cross sectional view of the embodiment of FIG. 3;

DETAILED DESCRIPTION OF THE PREFERRED EMBODIMENTS

Figure 5:
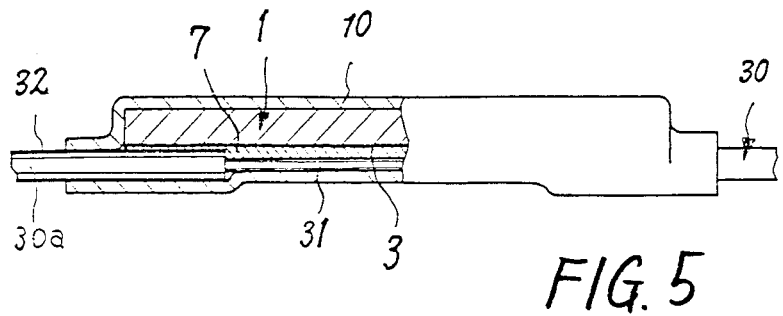
FIG. 5 is an elevational view partly in longitudinal cross section of a third embodiment of the invention.

Referring first to FIGS. 1 and 2, reference numerals 1 and 2 designate an upper or first reinforcement member and a lower or second reinforcement member, respectively. Each of the first and second reinforcement members 1, 2 has a generally elongate rectangular base or substrate 1a, 2a which is formed of a transparent crystallized glass as described above, and machined to the configurations illustrated in the figures. The bases 1a and 2a have rough contact surfaces 3 and 4, respectively, which are purposely roughened by machining such as a grinding or abrasive processing. The bases 1a and 2a further have mirror-like surfaces 5 and 6, respectively, which are opposite to the rough contact surfaces 3 and 4. The machined rough contact surfaces 3 and 4 have an arithmetic average roughness (arithmetic mean deviation from the mean line of the profile) within a range of about 0.1-20 microns. If the roughness is smaller than 0.1 microns, adhesive layers 7 and 8 formed on each base 1a and 2a as described below has an insufficient adhesive strength. If the roughness is larger than 20 microns, on the other hand, the first and second reinforcement members 1 and 2 have an insufficient mechanical strength. Certainly, the roughness of the contact surfaces 3 and 4 is determined also by a specific machining operation applied to the workpieces of the bases 1a and 2a.

After the machining operation, the entire surface of the bases 1a and 2a including the roughened contact surface 3 and 4 is chemically strengthened, while being subjected to a treatment involving an ion exchange reaction. For example, the ion exchange treatment may be effected by immersing the bases 1a and 2a of the crystallized glass in a molten bath of a $Na^+$ salt such as $NaNO_3$ or $Na_2SO_4$, or a $K^+$ salt such as $KNO_3$ or $KCl$, for a period between about 15 minutes and about 24 hours, while maintaining the bath at a temperature between 350° and 550° C. As a result, a strengthened layer (not shown) having a thickness of some tens of microns is formed by ion exchange, over the entire surface of each base 1a and 2a, whereby the mechanical strength of the crystallized glass base 1a and 2a is significantly improved. Since relatively large compressive stresses arise within the ion-exchange strengthened layers, the strength at the machined rough surfaces 3 and 4 may also be considerably improved.

The adhesive layers 7 and 8 indicated above are formed on the contact surfaces 3 and 4 thus strengthened by the strengthened layers formed thereon. These adhesive layers 7 and 8 are formed of an adhesive material such as polyethylene which is easily thermally fusible upon application of heat during a hot-pressing operation on the first and second reinforcement members 1 and 2, so as to sandwich an optical-fiber cable 30 between two polyethylene films. The cable 30 has a plurality of optical fibers 30a which include spliced stripped parts 31, and coated or covered parts 32, 32 adjacent to the spliced parts 31. In the coated parts 32, 32, the optical fibers 30a are covered by a resin such as a UV resin or nylon. The first and second reinforcement members 1 and 2 are hot-pressed such that the spliced stripped parts 31 and the coated parts 32, 32 are secured between the first and second reinforcement members 1 and 2, with the adhesive layers 7, 8 fused to surround the spliced and coated parts 31 and 32. The molten adhesive materials 7 and 8 adhere to the roughened contact surfaces 3 and 4 of the bases 1a and 2a. The adhesive material must be transparent at least after it has once melted, so that the adhesive material renders the roughened contact surfaces 3 and 4 transparent. In the present embodiment, at least a portion of the mirror-like surface 5 of the base 1a of the upper, first reinforcement member 1, which corresponds to the spliced stripped parts 31 of the cable 30, has an arcuate shape in transverse cross section as shown in FIG. 2, so that the base 1a provides a semi-cylindrical portion which serves as a convex lens. This convex lens portion of the base 1a permits easy visual inspection of the spliced stripped parts 31 of the optical-fiber cable 30.

The mirror-like surface 5 of the first reinforcement member 1 further has a marking 9 formed thereon to facilitate identification of the surface 5 of an assembly of the reinforcement members 1 and 2, even when the joint of the optical-fiber cable 30 is situated at a relatively dark location, as in a manhole. While this marking 9 provided in the present embodiment is printed on the surface 5, it may be a protrusion or indentation formed on the surface 5. Alternatively, the marking 9 may be provided in the form of an inclined cut at an edge of the surface 5, or in other suitable forms.

The reinforcement members 1 and 2 thus constructed are used in the following manner.

Initially, the joint of the optical-fiber cable 30 whose optical fibers 30a are spliced by fusion welding at the stripped parts 31 is placed on the adhesive layer 8 of the lower, second reinforcement member 2. Then, the upper, first reinforcement member 1 is superimposed on the lower reinforcement member 2, such that the joint of the cable 30 is sandwiched between the adhesive layers 7 and 8. Subsequently, the assembly is subjected to a hot-pressing operation at a temperature of 150°-180° C. Consequently, the adhesive layers 7 and 8 are fused, and the joint of the optical-fiber cable 30 is embedded in the mass of the adhesive material of the adhesive layers 7 and 8, as indicated in FIG. 2. Since the bases 1a and 2a of the reinforcement members 1 and 2 are formed of a transparent crystallized glass which has a major crystalline component consisting of $Li_2O$, $Al_2O_3$ and $SiO_2$, the bases 1a and 2a have substantially the same coefficient of thermal expansion as that of the optical fibers 30a of the cable 30. Therefore, appreciable thermal stresses will not be induced in the joint of the optical-fiber cable 30 reinforced by the reinforcement members 1 and 2. Further, the bases 1a and 2a are given a sufficient mechanical strength by the ion-exchange strengthened layer formed over their entire surfaces. The reinforcement members 1 and 2 will not be broken or fractured when they fall concrete from a height of 1.5 m, or when they are subjected to a hot-pressing operation. Moreover, the adhesive layers 7 and 8 are firmly anchored to the roughened contact surfaces 3 and 4, with the adhesive material adhering to the roughened contact surfaces 3 and 4 during the hot-pressing operation, providing a sufficient bonding force. Thus, the joint of the optical-fiber cable 30 is protected against separation from the reinforcement members 1 and 2 during a life time of the cable 30. In addition, the adhesive material of the adhesive layers 7 and 8 functions to smooth the rough contact surfaces 3 and 4, enables the bases 1a and 2a to recover their transparency, and allows for easy inspection of the spliced parts 31 of the optical fibers 30a after the joint has been sandwiched by the reinforcement members 1 and 2.

Referring next to FIGS. 3 and 4, there is shown a second embodiment of the present invention, in which the base 2a of the lower or second reinforcement member 2 is formed with a rectangular groove 2' whose bottom is defined by the rough contact surface 4. As shown in FIG. 4, the upper or first reinforcement member 1 is substantially accommodated within the groove 2', when the upper and lower reinforcement members 1 and 2 are used for reinforcing the joint of the cable 30. The base 2a of the lower reinforcement member 2 may be obtained by cutting a planar workpiece of a crystallized glass, by a suitable diamond cutting-off wheel. During this cutting operation, the groove 2' may be simultaneously formed with high precision and efficiency, by a diamond grooving wheel rotated about the same axis as the cutting-off wheel. As in the first embodiment, the contact surfaces 3 and 4 of the bases 1a, 2a are purposely roughened by machining, the entire surfaces of the bases 1a and 2a including the contact surfaces 3, 4 are strengthened by an ion-exchange treatment, and the adhesive layers 7 and 8 are formed on the contact surfaces 3 and 4. While the optical-fiber cable 30 illustrated in FIGS. 3 and 4 has a single optical fiber 30a, the present embodiment may be used for the optical-fiber cable having a plurality of optical fibers as shown in FIGS. 1 and 2.

Figure 6:
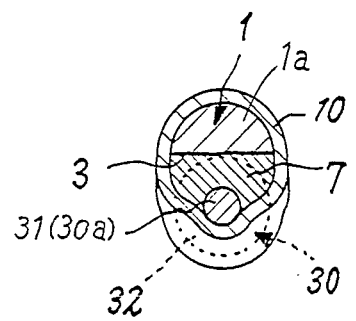
FIG. 6 is an elevational view in transverse cross section of the embodiment of FIG. 5.

Referring to FIGS. 5 and 6, there is shown a third embodiment of the invention, which is different from the preceding embodiments, in that the reinforcement consists of a single reinforcement member 1. Like the base 1a of the preceding embodiments, the base 1a in this embodiment has a machined rough contact surface 3 on which the transparent adhesive layer 7 is formed. In the present embodiment, the optical-fiber cable 30 having a single optical fiber 30a is first secured to the contact surface 3 of the base 1a by the adhesive layer 7. Subsequently, the base 1a and the joint of the cable 30 secured to the base 1a are enclosed in a heat-shrinkable tube 10. In this respect, the present embodiment is different from the preceding embodiments. The heat-shrinkable tube 10 is made of a transparent material, to allow for easy inspection of the joint.

The second and third embodiments have the same advantages as described above with respect to the first embodiment. The third embodiment has an additional advantage that the tensile strength of the joint of the cable 30 is improved by even contraction of the heat-shrinkable tube 10.

While the present invention has been described in its preferred embodiment with a certain degree of particularity, it is to be understood that the invention is not limited to the precise details of the illustrated embodiment, but may be embodied with various changes, modifications and improvements which may occur to those skilled in the art, without departing from the scope of the invention defined in the following claims.

What is claimed is:

1. A reinforcement for reinforcing a joint at which two lengths of an optical-fiber cable consisting of at least one optical fiber are spliced by fusion welding, such that a spliced stripped part of each optical fiber and adjacent coated parts of the cable are secured to said reinforcement by means of an adhesive material, wherein the improvement comprises:
    a base formed of a transparent crystallized glass which has a major crystalline component consisting of $Li_2O$, $Al_2O_3$ and $SiO_2$ and which has a low coefficient of thermal expansion;
    said base having a rough contact surface which is roughened by machining and at which said base contacts said optical-fiber cable;
    a strengthened layer which is formed by ion exchange, on an entire surface of said base including said rough contact surface; and
    an adhesive layer which consists of said adhesive material and which is formed on said rough contact surface, said adhesive layer securing said optical-fiber cable to said base, upon heating of said adhesive layer, such that said adhesive material serves to smooth said rough contact surface, and thereby renders said rough contact surface transparent.

2. A reinforcement according to claim 1, wherein said rough contact surface is substantially flat, and said base further has an arcuate surface opposite to said rough contact surface, so that said base provides a convex lens.

3. A reinforcement according to claim 1, wherein said base has a marking formed on a surface thereof opposite to said rough contact surface, to identify said surface opposite to said rough contact surface.

4. A reinforcement according to claim 1, wherein said base is formed from a melt which includes 1.7-6% by weight of $Li_2O$, 12-35% by weight of $Al_2O_3$, and 55-75% by weight of $SiO_2$, as said major crystalline component of said crystallized glass, and further includes 0–3% by weight of $TiO_2$, 0.1–5% by weight of $ZrO_2$, and 0–5% by weight of $P_2O_5$, as a nucleation agent.

5. A reinforcement having a first reinforcement member and a second reinforcement member, for reinforcing a joint at which two lengths of an optical-fiber cable consisting of at least one optical fiber are spliced by fusion welding, such that a spliced stripped part of each optical fiber and adjacent coated parts of the cable are secured between said first and second reinforcement members by means of an adhesive material, each of said first and second reinforcement members comprising:

a base formed of a transparent crystallized glass which has a major crystalline component consisting of $Li_2O$, $Al_2O_3$ and $SiO_2$ and which has a low coefficient of thermal expansion;

said base having a rough contact surface which is roughened by machining and at which said base contacts said optical-fiber cable;

a strengthened layer which is formed by ion exchange, on an entire surface of said base including said rough contact surface; and an adhesive layer which consists of said adhesive material and which is formed on said rough contact surface, said adhesive layer securing said optical-fiber cable to said base, upon heating of said adhesive layer, such that said adhesive material serves to smooth said rough contact surface, and thereby renders said rough contact surface transparent.

6. A reinforcement according to claim 5, wherein said rough contact surface of the base of said each reinforcement member is substantially flat, and said base of one of said first and second reinforcement members further has an arcuate surface opposite to said rough contact surface thereof, so that said base of said one reinforcement member provides a convex lens.

7. A reinforcement according to claim 5, wherein said base of one of said first and second reinforcement members has a marking formed on a surface thereof opposite to said rough contact surface thereof, to identify said surface opposite to said rough contact surface.

8. A reinforcement according to claim 5, wherein said base of one of said first and second reinforcement members has a groove which has a bottom defined by said rough contact surface, the other of said first and second reinforcement members being at least partially accommodated in said groove of said one reinforcement member.

* * * * *